(12) United States Patent
Keller et al.

(10) Patent No.: US 8,184,795 B2
(45) Date of Patent: May 22, 2012

(54) METHOD AND SYSTEM FOR FLOOR CONTROL IN A WIRELESS NETWORK

(75) Inventors: Matthew C. Keller, Algonquin, IL (US); Tyrong D. Bekiares, Chicago, IL (US); Donald G. Newberg, Hoffman Estates, IL (US); Shanthi E. Thomas, Carpentersville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1343 days.

(21) Appl. No.: 11/462,065

(22) Filed: Aug. 3, 2006

(65) Prior Publication Data

US 2008/0043744 A1 Feb. 21, 2008

(51) Int. Cl.
*H04M 3/42* (2006.01)
*H04B 7/00* (2006.01)

(52) U.S. Cl. .............. 379/212.01; 379/211.02; 455/518

(58) Field of Classification Search ............. 379/211.02, 379/212.01, 201.01, 37; 370/260, 254; 455/518, 455/507, 519
See application file for complete search history.

(56) References Cited

U.S. PATENT DOCUMENTS

| | | | | |
|---|---|---|---|---|
| 2006/0040685 A1* | 2/2006 | Kwon | | 455/507 |
| 2007/0105578 A1* | 5/2007 | Shaffer et al. | | 455/518 |
| 2007/0133435 A1* | 6/2007 | Eneroth et al. | | 370/260 |
| 2007/0202905 A1* | 8/2007 | Abbate | | 455/518 |
| 2007/0274233 A1* | 11/2007 | Ptashek et al. | | 370/254 |

OTHER PUBLICATIONS

P. Koskelainen et al, Columbia University—Oct. 23, 2004—Internet Draft (IETF)—Expires Apr. 23, 2005. Requirement for Floor control Protocol draft-ietf-xcon-floor-control-req-02.txt—18 pages.
Tandberg MPS—User Manual—Section 3.3—Manage an active conference—pp. 26-32. as per http://www.conferencing.bt.com/pdf/Video%20Infrastructure/TANDBERG_MPS_user_man.pdf; July 2006.
G. Camarillo, et al. "The Binary Floor Control Protocol (BFCP)", RFC 4582, Network Working Group; Nov. 2006, pp. 1-66.
A. Neimi, Network Working Group, Internet Draft, "Problems With the Session Initiation Protocol (SIP) Events Framework", Jul. 12, 2005; 11 Pages.

* cited by examiner

*Primary Examiner* — Thjuan K Addy
(74) *Attorney, Agent, or Firm* — Randi L. Karpinia; Steven A. May

(57) ABSTRACT

A method and system for establishing floor control in a communication session enables remote control of devices in a network and provides a status update concerning floor ownership. The method includes processing at a floor controller a floor request message received from a first endpoint, where the floor request message requests that floor ownership be provided to a second endpoint (step 305). A floor control announcement message is then transmitted from the floor controller to at least both the first endpoint and the second endpoint, where the floor control announcement message indicates that the second endpoint has floor ownership (step 315).

20 Claims, 3 Drawing Sheets

METHOD AND SYSTEM FOR FLOOR CONTROL IN A WIRELESS NETWORK

FIELD OF THE INVENTION

The present invention relates generally to data transmission between endpoints in a wireless communications network, and in particular relates to establishing floor control in a communication session.

BACKGROUND OF THE INVENTION

Multimedia and group communications have become an important aspect of telecommunications, and the demand for such continues to increase. For instance, the Final Report of the Public Safety Wireless Advisory Committee to the Federal Communications Committee (FCC), dated 1996, expressed the critical need for communication resources for multimedia. Subsequently in 1998, the FCC established a band plan for the 764 MHz frequencies that included spectrum set aside for public safety wideband. In addition, the Internet Engineering Task Force (IETF) has developed a suite of protocols that are designed for use in multimedia communications.

Since its approval in early 1999 as an official standard, a Session Initiation Protocol (SIP) has gained tremendous market acceptance for signaling communications services on the Internet. As such, numerous products incorporate the SIP standard, including but not limited to SIP desktop telephones, SIP telephony servers, and personal computing (PC) devices running SIP applications. SIP is a text-based signaling transactional protocol, similar to Hypertext Transfer Protocol (HTTP) and Simple Mail Transfer Protocol (SMTP), and works in the Application layer of the Open Systems Interconnection (OSI) communications model. SIP messages are used for call control, e.g., to control interactive communications sessions or calls, such as voice, video, and chat, between users in a communications network. Each user is typically associated with a wireless communication device that is connected to the network.

SIP was designed for controlling media communication sessions and for establishing media communication sessions between an initiating device and one recipient device or a group of recipient devices. Moreover, for communications between a group of devices, there are typically limited shared radio resources for transmitting and receiving media data. Therefore, communication systems may accordingly implement some form of floor control to control access to those limited shared radio resources.

For many decades, half duplex two way radio networks have provided reliable and convenient communications using limited shared radio resources. For example, "walkie-talkie" and citizens band (CB) radio networks have enabled users to maintain direct communication channels with other users over extended periods of time. The push-to-talk (PTT) and "instant on" features of half duplex radio devices provide desirable modes of wireless communication for users such as truckers, construction and industrial site personnel, military personnel, taxi dispatchers, police and fire personnel and numerous others. Modern communications systems designed for public safety still typically allocate only one logical media stream in a network, which is shared among network participants. A floor control mechanism then dictates which device in the network is permitted to send media at a given time on a given stream.

Push-to-talk over cellular (PoC) is a recent technology that enables familiar PTT and "instant on" features of conventional half duplex radios, but using mobile communication devices operating over modern cellular telecommunications networks. Using PoC, wireless communication devices such as mobile telephones and notebook computers can therefore function as PTT half-duplex radio devices. Other types of multimedia call models (MMCMs) are also available that provide functionality similar to PoC.

Floor control in a PoC or MMCM session is generally maintained by a PoC or MMCM network server that controls communications between two or more wireless communication devices. When a user of one of the communication devices keys a PTT button, a request for permission to speak in the PoC or MMCM session is transmitted from the user's device to the PoC or MMCM server using, for example, a real-time transport protocol (RTP) message. If no other users are currently speaking in the PoC or MMCM session, an acceptance message is transmitted back to the user's device and the user can then speak into a microphone of the device. Using standard compression/decompression (codec) techniques, the user's voice is digitized and transmitted using discrete voice data packets, such as according to RTP and internet protocols (IP), to the PoC or MMCM server. The PoC or MMCM server then transmits the voice data packets to other users of the PoC or MMCM session, using for example a point to multipoint communication technique.

BRIEF DESCRIPTION OF THE DRAWINGS

In order that the invention may be readily understood and put into practical effect, reference now will be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Figure 1:
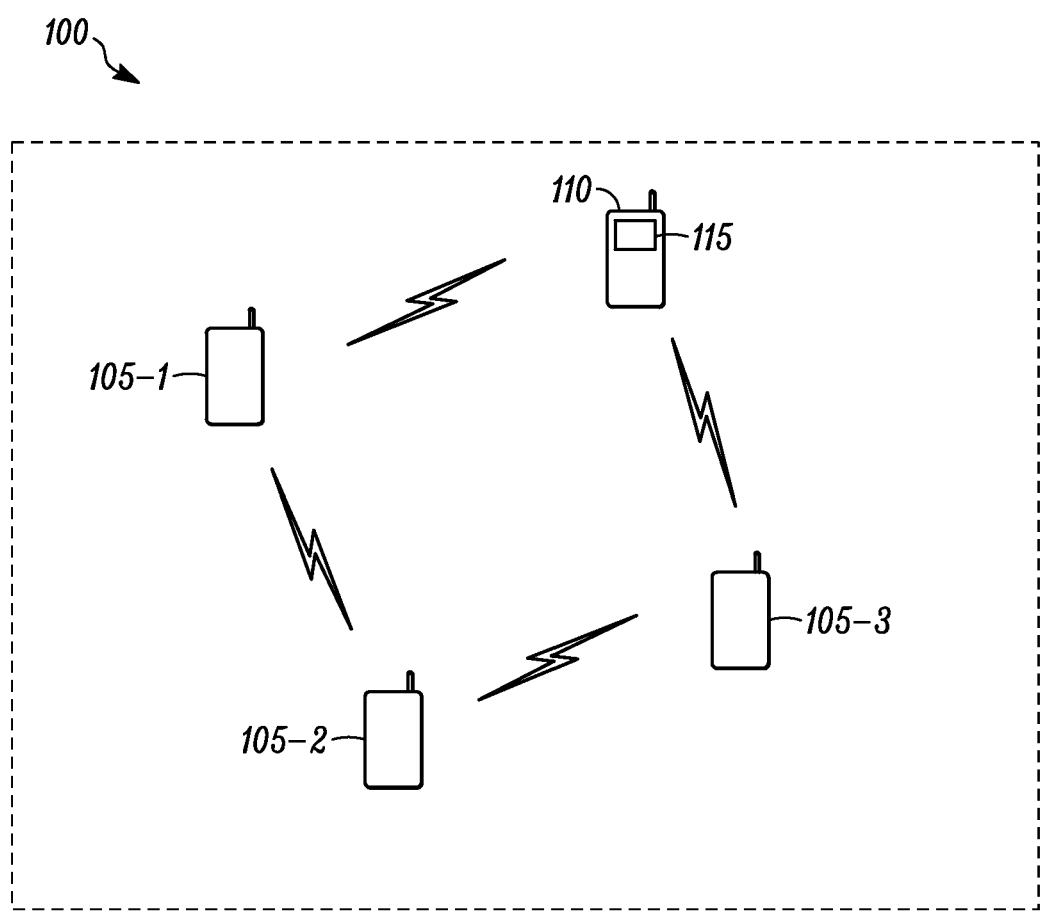
FIG. 1 is a schematic diagram illustrating a wireless communications network, according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to establishing floor control in a communication session. Accordingly, the apparatus components and method steps have been represented where appropriate by conventional symbols in the drawings, showing only those specific details that are pertinent to understanding the embodiments of the present invention, so as not to obscure the disclosure with details that will be readily apparent to those of ordinary skill in the art having the benefit of the description herein.

In this document, relational terms such as left and right, first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of establishing floor control in a communication session as described herein. The non-processor circuits may include, but are not limited to, a radio receiver, a radio transmitter, signal drivers, clock circuits, power source circuits, and user input devices. As such, these functions may be interpreted as steps of a method for establishing floor control in a communication session. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Referring to FIG. 1, a schematic diagram illustrates a wireless communications network 100, according to some embodiments of the present invention. Three endpoints 105-$n$ (i.e., 105-1, 105-2, and 105-3) are in wireless communication with each other and with a floor controller 110. As described in detail below, the floor controller 110 comprises computer readable program code components 115 for establishing floor control in a communication session in accordance with the teachings of the present invention. Floor control refers to control of which endpoint 105-$n$ is sourcing media on a logical stream, for example, for the purposes of controlling limited shared radio resources in the network 100. The floor controller 110 can thus reside in various locations such as in a push to talk over cellular (PoC) server, in a multimedia call model (MMCM) server, or in one of the endpoints 105-$n$ in the network 100 in the form of a mobile telephone, notebook computer, two-way radio, personal digital assistant (PDA), or other wireless communication device.

Each endpoint 105-$n$ typically comprises a logical entity, e.g., a user, and a physical counterpart, e.g., a terminal comprising a wireless communication device. Thus, according to some embodiments of the present invention, each endpoint 105-$n$ in the network 100 comprises a unique user and terminal binding, wherein each terminal has the following example capabilities: push to talk (PTT) functionality to enable communication with the floor controller 110, means for affiliating itself with a group, being able to participate in IP-based call control, and being able to exchange media. The endpoints 105-$n$ generally comprise both a session initiation protocol (SIP) user agent client (UAC) and an SIP user agent server (UAS) to enable the endpoint 105-$n$ to interact within the network 100 to setup, modify, and take down either group directed or individual directed sessions. In order to place or receive calls, an endpoint 105-$n$ must first register with the network 100. Since SIP signaling is generally utilized for all session control signaling, an SIP REGISTER method can be used, wherein all SIP REGISTER requests may be forwarded to a registration manager (not shown). If an endpoint 105-$n$ desires to be a member of a group, it may affiliate with that group using an AFFILIATE method wherein all affiliation requests may be forwarded to a group database manager (not shown). An endpoint 105-$n$ also may be configured for receiving SAP announcements to inform the endpoint 105-$n$ of the addition and removal of sessions within the context of a group.

During a session, according to some embodiments of the present invention, endpoints 105-$n$ can interact directly with the floor controller 110 for the purpose of controlling the source for a particular session's media streams. The protocol used for floor control interaction can be specified using a communication description protocol such as a session description protocol (SDP) as part of SIP and SAP session signaling. Further details concerning the network 100, according to some embodiments of the present invention, are described in U.S. patent application Ser. No. 11/196,942, filed on Aug. 4, 2005, entitled "METHOD AND APPARATUS FOR FLOOR CONTROL IN A COMMUNICATION SYSTEM," assigned to the assignee of the present invention, which application is hereby incorporated by reference herein in its entirety.

According to some embodiments of the present invention, the wireless communications network 100 can comprise a Mobile Ad Hoc Network (MANET). As known by those skilled in the art, MANETs are based on autonomous collections of mobile communication devices that communicate with each other over wireless links having limited bandwidths. MANETs are usually temporary packet radio networks which do not involve significant supporting infrastructure and in which the user nodes themselves perform routing functions.

For example, for purposes of further describing a specific embodiment of the present invention, consider that the wireless communications network 100 is a MANET that comprises communications equipment of an incident response team that has recently arrived at an incident scene. The incident scene may include for example a crime scene, a fire scene, an accident scene, a biological or a chemical hazard scene, or an other type of incident scene.

Thus consider, for example, that the network 100 comprises the following specific equipment: The endpoint 105-1 is a two-way portable radio worn by a first police officer. The endpoint 105-2 is coupled to a portable video camera that has been set up by the first police officer and then left by itself to monitor an aspect of the incident scene, such as the front door of a building. The endpoint 105-3 is a two-way radio worn by a second police officer, and the floor controller 110 operates from a notebook computer at a nearby police mobile command station. The two police officers and others in the response team are then able to communicate over the network 100 using half-duplex, push-to-talk (PTT) communications.

As described in more detail below, the first police officer is able to use the endpoint 105-1 to remotely signal, through the floor controller 110, the endpoint 105-2 to begin transmitting a live video data stream to all members of the network 100, including the first and second police officers at the endpoints 105-1 and 105-2, respectively. Through the floor controller 110, the endpoints 105-n are thus able to assign floor ownership in the network 100 to other endpoints 105-n.

Figure 2:
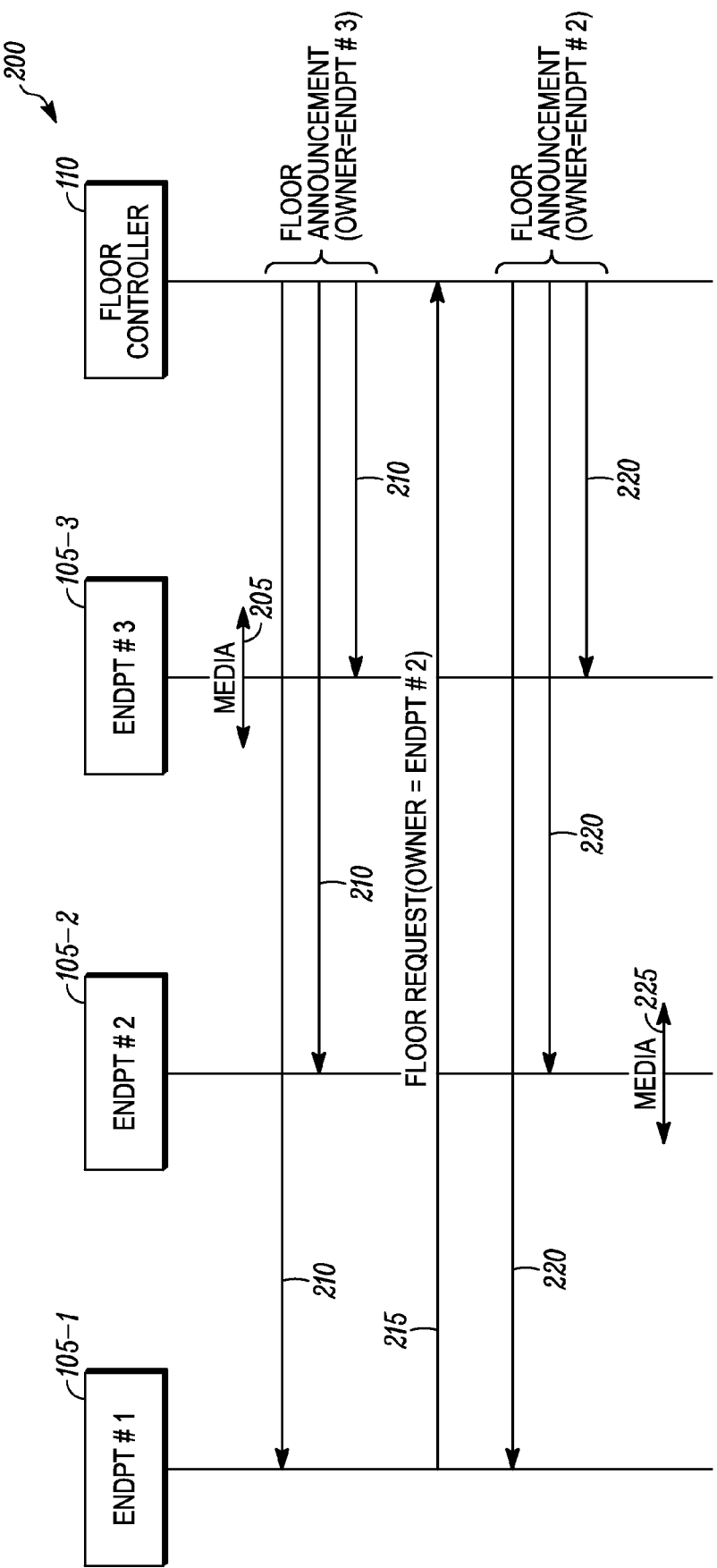
FIG. 2 is a message sequence chart illustrating an example of communications in a network for establishing floor control in a communication session, according to some embodiments of the present invention.

Referring to FIG. 2, a message sequence chart 200 illustrates an example of communications in the network 100 for establishing floor control in a communication session, according to some embodiments of the present invention. As will be understood by those skilled in the art, floor control refers to control of which endpoint is sourcing media on the logical stream, for example, for the purposes of controlling limited shared radio resources in the network 100. Those skilled in the art will recognize and appreciate, however, that the specifics of this illustrative example are not specifics of the present invention itself and that the teachings set forth herein are applicable in a variety of alternative settings. For example, since the teachings described do not depend on a particular communication model architecture and communication control protocols, they can be applied to various types of—communication models and communication control protocols. As such, other alternative implementations of the present invention using different types of communication model architectures and communication control protocols are contemplated and are within the scope of the various teachings described.

Consider that at line 205 the endpoint 105-3 is broadcasting media data to other endpoints 105-n in the network 100. For example, in the situation described above the second police officer could be using the endpoint 105-3 to speak to other police officers in the network 100, and digitized wireless voice data from the second police officer is represented by the line 205. Alternatively, for example, the second police officer could be transmitting video data over the network 100 from a video camera coupled to the endpoint 105-3.

For purposes of the present invention, a communication session is therefore defined broadly to include any type of communication session that enables a push-to-talk (PTT), push to video, push to view or push to sense type of connection over a packet data network. One embodiment of the present invention employs a multimedia call model (MMCM) such as described in U.S. patent application Ser. No. 11/196,942, filed on Aug. 4, 2005, entitled "METHOD AND APPARATUS FOR FLOOR CONTROL IN A COMMUNICATION SYSTEM," assigned to the assignee of the present invention, which application is hereby incorporated by reference herein in its entirety.

Thus a communication session can include, for example, a MMCM session, a voice-only push to talk over cellular (PoC) session, a multimedia session such as a push to experience (PTX) session that includes push-to-video and push-to-view, or a multimedia session that conforms to a Telecommunications Industry Association (TIA) inter sub-system interoperability (ISSI) standard. Media data as described in the present specification are therefore also defined broadly to include, for example, audio data, speech data, multimedia data, video data, text data, still image data, or other sense data, depending on the features, specifications or capabilities of particular embodiments of the present invention.

At lines 210, the floor controller 110 transmits a floor control announcement message to each of the endpoints 105-1, 105-2 and 105-3. As will be understood by those skilled in the art, floor control announcement messages can be transmitted using various means such as multicast or multi-unicast transmissions. The floor control announcement message indicated by the lines 210 can inform all endpoints 105-n operating in the network 100, where, as will be understood by those skilled in the art, the network 100 is generally a logical network and is not limited to a physical network, that the endpoint 105-3 is currently the owner of a logical communication channel, also known as a logical communication stream, over which the endpoints 105-n are communicating.

Next, consider that the endpoint 105-1 seeks to take floor ownership from the endpoint 105-3 and have it assigned to the endpoint 105-2. For example, in the situation described above, the first police officer seeks to have video data from the camera of the endpoint 105-2 broadcast over the network 100. At line 215, the endpoint 105-1 therefore transmits a floor request message to the floor controller 110, requesting that floor ownership be assigned to the endpoint 105-2.

If the floor controller 110 determines that it is appropriate to have floor ownership transferred to the endpoint 105-2, then, in response to the floor request message, the floor controller 110 transmits a second floor control announcement message, indicated by lines 220. The second floor control announcement message announces to the network 100 that the endpoint 105-2 now has floor ownership. Further, the second floor control announcement message indicated by the lines 220 can instruct the endpoint 105-2 to begin broadcasting media. The second floor control announcement message indicated by the lines 220 can also instruct the endpoint 105-3 to stop transmitting media data. Finally, at line 225, in response to the second floor control announcement message, the endpoint 105-2, such as the remote video camera that was set up by the first police officer in the example described above, begins transmitting media data to the endpoints 105-n in the network 100.

Floor request and floor control announcement messages therefore have numerous advantages, according to various embodiments of the present invention. For example, floor control announcement messages transmitted in response to a floor request message can instruct endpoints 105-n in the network 100 to either stop or begin transmitting media data. Also, floor control announcement messages such as those indicated by the lines 210 and 220 can be sent periodically by the floor controller 110. This enables new endpoints 105-n that attach to the network 100 to receive an update concerning floor ownership in the network 100. Also, endpoints 105-n that have temporarily dropped out of and then rejoined the network 100, for example due to a communication fade caused by radio frequency interference, can employ a periodic floor control announcement message received from the floor controller 110 as a reliability mechanism that ensures that information concerning a floor ownership change was not missed during the communication fade. According to some embodiments of the present invention, each endpoint in a network may not receive every floor announcement. For example, there may be different logical divisions that determine which endpoints receive a floor announcement, including, for example, group membership, session participation, and the physical network connection of the endpoint.

A floor control announcement message also can enable an endpoint 105-n to synchronize its media processing to a new source that is identified in the floor control announcement message. For example, a synchronization identification can be included in the floor control announcement message. The same synchronization identification is then included in media data that are transmitted from an endpoint 105-n that currently owns the floor in a communication session. Other endpoints 105-n that receive the media data are then able to compare the synchronization identification provided in the floor control announcement message with the synchronization identification included in the media data. If there is a match, then the media data are played; otherwise the media data are discarded. That enables the endpoints 105-n to filter extraneous signals from sources that have not been authorized by the floor controller 110.

Further, as illustrated in FIG. 2, floor control announcement messages can be used to provide instructions to an endpoint 105-n to begin transmitting media data. Thus for example the endpoint 105-1 can remotely control the endpoint 105-2 using the floor controller 110.

One example of a floor request message, such as the floor request message indicated by the line 215 in FIG. 2, according to an embodiment of the present invention, is provided below:

```
<FloorControlMsg>
    <FloorMsgType>claim_floor</FloorMsgType>
    <SessionGUID>lab 114797930810 9 0 IN IP4 mot </SessionGUID>
    <StreamId>1</StreamId>
    <RequestedOwner>sip:second_device@10.8.121.101:29000
    </RequestedOwner>
    <RequesterURI>sip:lab@10.8.121.100:29000</RequesterURI>
    <MediaSource>Cam 1</MediaSource>
</FloorControlMsg>
```

One example of a floor control announcement message, such as the floor control announcement message indicated by the lines 220 in FIG. 2, according to an embodiment of the present invention, is provided below:

```
<FloorControlMsg>
    <FloorMsgType>floor_announcement</FloorMsgType>
    <SessionGUID>lab 114797930810 9 0 IN IP4 mot</SessionGUID>
    <StreamId>1</StreamId>
    <Floor Owner>sip:second_device@10.8.121.101:29000</FloorOwner>
    <CurrentSsrc>274</CurrentSsrc>
    <MediaSource>Cam1</MediaSource>
</FloorControlMsg>
```

Figure 3:
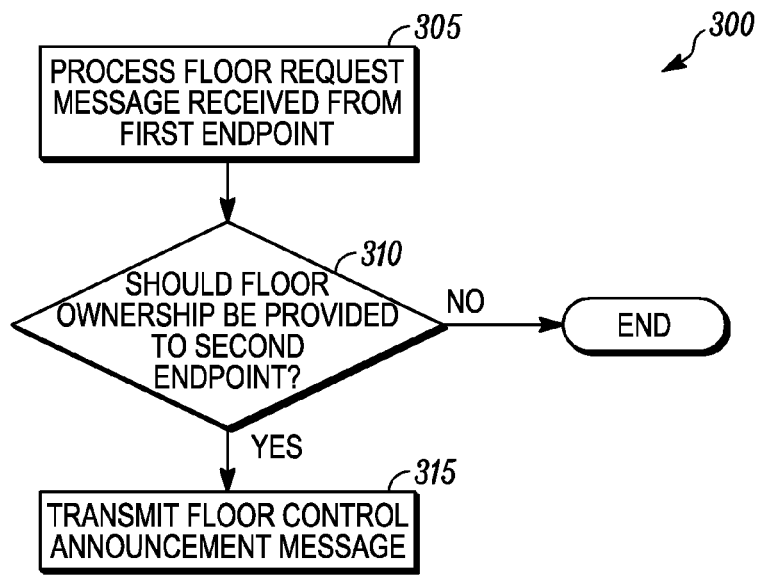
FIG. 3 is a general flow diagram illustrating a method for establishing floor control in a communication session, according to some embodiments of the present invention.

Referring to FIG. 3, a general flow diagram illustrates a method 300 for establishing floor control in a communication session, according to some embodiments of the present invention. At step 305, a floor controller processes a floor request message received from a first endpoint, where the floor request message requests that floor ownership be provided to a second endpoint. For example, as described above, the floor controller 110 processes the floor request message indicated by the line 215 received from the endpoint 105-1, where the floor request message indicated by the line 215 requests that floor ownership be provided to the endpoint 105-2. At step 310, the floor controller determines whether floor ownership should be provided to the second endpoint based on the floor request message received from the first endpoint. For example, the floor controller 110 may determine whether the endpoint 105-1 is authorized to request that floor ownership be provided to the endpoint 105-2. The endpoint 105-1 can be one of only a limited number of endpoints 105-n in the network 100 that are authorized to remotely control the camera located at the endpoint 105-2. A list of such endpoints 105-n that are authorized to request that floor ownership be provided to the endpoint 105-2 can be stored, for example, at the floor controller 110. The list is then checked by the floor controller 110 after the floor request message 215 is received.

Further, the floor controller may determine, at step 310, whether floor ownership should be provided to the second endpoint based on other factors. Such factors can include, for example, whether the endpoint 105-2 is authorized to own the floor, or whether a particular floor control algorithm in use allows a floor change. If at step 310 it is determined that floor ownership should not be provided to the second endpoint then the method 300 ends.

If at step 310 it is determined that the first endpoint is authorized to request that floor ownership be provided to the second endpoint, then at step 315 a floor control announcement message is transmitted from the floor controller to at least both the first endpoint and the second endpoint. The floor control announcement message indicates that the second endpoint has floor ownership. For example, the floor controller 110 transmits the floor control announcement message indicated by the lines 220 to the endpoints 105-1 and 105-2 and indicates that the endpoint 105-2 has floor ownership. As described above, the floor control announcement message indicated by the lines 220 also can be transmitted to other endpoints 105-n in the network 100, such as the endpoint 105-3. In response to the floor control announcement message, the second endpoint then begins transmitting.

Figure 4:
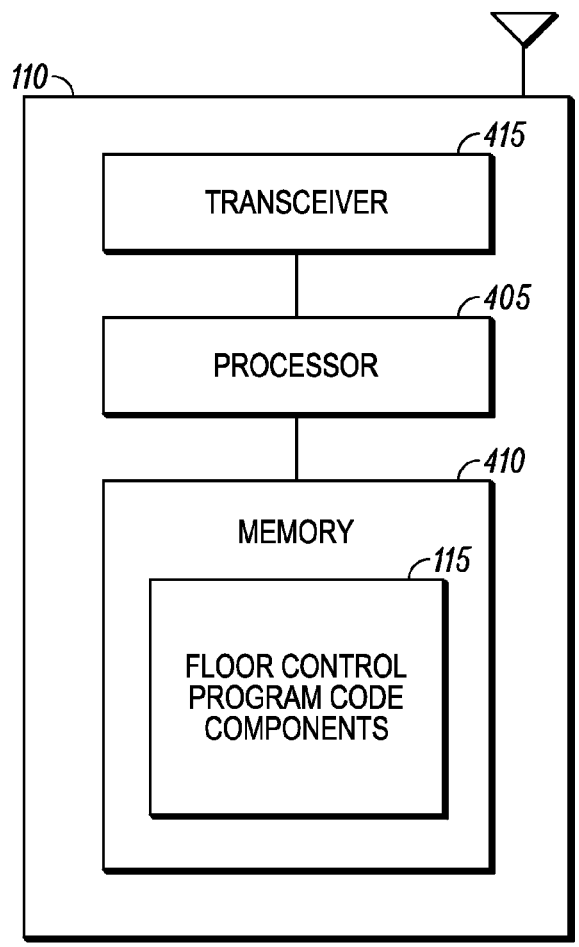
FIG. 4 is a schematic diagram illustrating components of a floor controller of a wireless communications network, according to some embodiments of the present invention.

Referring to FIG. 4, a schematic block diagram illustrates components of the floor controller 110 of the wireless communications network 100, according to some embodiments of the present invention. Those skilled in the art will recognize that the present invention can be embodied in a system of the floor controller 110, for example, in the form of a push to talk over cellular (PoC) server. Alternatively, the floor controller 110 can be embodied in one of the endpoints 105-n in the network 100 in the form of a mobile telephone, notebook computer, two-way radio, personal digital assistant (PDA), or other wireless communication device. As will be understood by those skilled in the art, multiple endpoints also can be incorporated into a single wireless communication device. For example, multiple users can log into a single communication terminal, such as a single computer terminal in a police car, and the floor controller 110 will consider each user to be operating from a separate endpoint 105-n. As another example, multiple communication systems, such as a land mobile radio system and a broadband communication system, operating at a single multi-mode wireless communication terminal, can be considered for purposes of the present invention to be each a separate endpoint 105-n.

A system of the floor controller 110 can include a processor 405 such as a standard microprocessor or application specific integrated circuit (ASIC) operatively coupled to a memory 410. The memory 410 comprises a computer readable medium such as a random access memory (e.g., static random access memory (SRAM)), read only memory (e.g., programmable read only memory (PROM), or erasable programmable read only memory (EPROM)), or hybrid memory (e.g., FLASH) as is well known in the art. The computer readable medium then comprises the computer readable program code components 115 for establishing floor control in a communication session that, when processed by the processor 405, are configured to cause the execution of the above described steps of the method 300. Communications such as those involved in the method 300 are then transmitted from or received by a transceiver 415 that is operatively coupled to the processor 405.

Advantages of embodiments of the present invention thus include enabling devices in a wireless network, such as the endpoints 105-n in the network 100, to assign floor ownership in a communication session to other devices in the network. Floor ownership is established through a floor controller that can ensure that floor request messages that seek to change floor ownership are appropriately authorized. Further, floor control announcement messages transmitted from the floor controller can provide instructions to a device to begin transmitting. Also, floor control announcement messages can be transmitted periodically so that all devices in the network can maintain an updated status concerning floor ownership.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

We claim:

1. A method for establishing floor control in a communication session, the method comprising:
    processing at a floor controller a floor request message received from a first endpoint, wherein the floor request message includes an identifier of a second endpoint, which indicates a request that floor ownership be provided to the second endpoint; and
    transmitting a floor control announcement message from the floor controller to at least both the first endpoint and the second endpoint, wherein the floor control announcement message indicates that the second endpoint has floor ownership.

2. The method of claim 1, further comprising:
    determining at the floor controller whether floor ownership should be provided to the second endpoint based on the floor request message received from the first endpoint.

3. The method of claim 1, wherein the floor control announcement message is transmitted periodically from the floor controller.

4. The method of claim 1, wherein the floor control announcement message instructs the second endpoint to begin transmitting media data in the communication session.

5. The method of claim 1, further comprising transmitting the floor control announcement message to a plurality of additional endpoints participating in the communication session.

6. The method of claim 1, wherein the communication session comprises a multimedia call model (MMCM) session, a push to talk over cellular (PoC) session, a push to experience (PTX) session, or a multimedia session that conforms to a Telecommunications Industry Association (TIA) inter sub-system interoperability (ISSI) standard.

7. The method of claim 1, wherein the floor controller comprises a push to talk over cellular (PoC) server or a multimedia call model (MMCM) server.

8. The method of claim 1, wherein the floor controller comprises a third endpoint participating in the communication session.

9. The method of claim 1, wherein the floor control announcement message instructs a third endpoint to stop transmitting media data.

10. The method of claim 2, wherein determining at the floor controller whether floor ownership should be provided to the second endpoint based on the floor request message received from the first endpoint, comprises determining:
    whether the first endpoint is authorized to request that floor ownership be provided to the second endpoint;
    whether the second endpoint is authorized to have floor ownership; or
    whether a particular floor control algorithm in use allows a floor change.

11. A system for establishing floor control in a communication session, the system comprising:
    computer readable program code components configured to cause processing at a floor controller a floor request message received from a first endpoint, wherein the floor request message includes an identifier of a second endpoint, which indicates a request that floor ownership be provided to the second endpoint; and
    computer readable program code components configured to cause transmitting a floor control announcement message from the floor controller to at least both the first endpoint and the second endpoint, wherein the floor control announcement message indicates that the second endpoint has floor ownership.

12. The system of claim 11, further comprising:
    computer readable program code components configured to cause determining at the floor controller whether floor ownership should be provided to the second endpoint based on the floor request message received from the first endpoint.

13. The system of claim 11, wherein the floor control announcement message is transmitted periodically from the floor controller.

14. The system of claim 11, wherein the floor control announcement message instructs the second endpoint to begin transmitting media data in the communication session.

15. The system of claim 11, further comprising:
    computer readable program code components configured to cause transmitting the floor control announcement message to a plurality of additional endpoints participating in the communication session.

16. The system of claim 11, wherein the communication session comprises a multimedia call model (MMCM) session, a push to talk over cellular (PoC) session, a push to experience (PTX) session, or a multimedia session that conforms to a Telecommunications Industry Association (TIA) inter sub-system interoperability (ISSI) standard.

17. The system of claim 11, wherein the floor controller comprises a push to talk over cellular (PoC) server or a multimedia call model (MMCM) server.

18. The system of claim 11, wherein the floor controller comprises a third endpoint participating in the communication session.

19. The system of claim 11, wherein the floor control announcement message instructs a third endpoint to stop transmitting media data.

20. A system for establishing floor control in a communication session, the system comprising:
    means for processing at a floor controller a floor request message received from a first endpoint, wherein the floor request message includes an identifier of a second endpoint, which indicates a request that floor ownership be provided to the second endpoint; and
    means for transmitting a floor control announcement message from the floor controller to at least both the first endpoint and the second endpoint, wherein the floor control announcement message indicates that the second endpoint has floor ownership.

* * * * *